United States Patent
Zhao et al.

(10) Patent No.: US 11,529,772 B2
(45) Date of Patent: Dec. 20, 2022

(54) APPARATUS AND METHOD FOR EFFICIENTLY PREPARING MULTI-DIRECTIONAL CONTINUOUS FIBER-REINFORCED COMPOSITE MATERIAL

(71) Applicant: Shaanxi University of Science & Technology, Shaanxi (CN)

(72) Inventors: Xueni Zhao, Shaanxi (CN); Mingyue Liu, Shaanxi (CN); Zhenzhen Gui, Shaanxi (CN); Ao Liu, Shaanxi (CN); Jiamei Zheng, Shaanxi (CN); Sensen Wei, Shaanxi (CN); Xueyan Chen, Shaanxi (CN)

(73) Assignee: Shaanxi University of Science & Technology, Xi'an (CN)

( * ) Notice: Subject to any disclaimer, the term of this patent is extended or adjusted under 35 U.S.C. 154(b) by 0 days.

(21) Appl. No.: 17/477,452

(22) Filed: Sep. 16, 2021

(65) Prior Publication Data
US 2022/0001629 A1    Jan. 6, 2022

(30) Foreign Application Priority Data
Sep. 30, 2020 (CN) ............................ 202011057701

(51) Int. Cl.
| | |
|---|---|
| *B29C 70/46* | (2006.01) |
| *B29C 70/22* | (2006.01) |
| *B29C 70/34* | (2006.01) |
| *B29C 70/54* | (2006.01) |

(52) U.S. Cl.
CPC ............ *B29C 70/345* (2013.01); *B29C 70/54* (2013.01)

(58) Field of Classification Search
CPC ... B29C 70/202; B29C 70/207; B29C 70/228; B29C 70/304; B29C 70/465; B29C 70/24; B29C 70/56
See application file for complete search history.

(56) References Cited

U.S. PATENT DOCUMENTS

| | | | | |
|---|---|---|---|---|
| 3,322,868 | A * | 5/1967 | Rossello | ................. D04H 3/07 264/46.7 |
| 3,718,952 | A * | 3/1973 | Palfreyman | ........... B29C 70/202 28/150 |
| 4,257,835 | A * | 3/1981 | Bompard | .............. F16D 69/023 428/218 |

(Continued)

FOREIGN PATENT DOCUMENTS

| | | |
|---|---|---|
| AU | 2020100834 A4 | 7/2020 |
| CN | 107364154 A | 11/2017 |

(Continued)

*Primary Examiner* — Matthew J Daniels

(57) ABSTRACT

An apparatus and a method for preparing a multi-directional continuous fiber-reinforced composite material. The apparatus includes an electrostatic fiber-splitting device configured to controllably split a fiber bundle, a powder spreading device configured to spread a powder, and a pre-press molding device configured to cut the fiber and compact the powder. The electrostatic fiber-splitting device includes a rotatable fiber-splitting table. The pressing plate is controlled by an electromagnet, and the pressing plate is energized to generate a high-voltage electrostatic field to disperse the continuous fiber bundle into monofilament fibers.

5 Claims, 10 Drawing Sheets

(56) References Cited

U.S. PATENT DOCUMENTS

| | | | | |
|---|---|---|---|---|
| 4,404,156 A * | 9/1983 | Ogletree | ................ | B29C 70/16 |
| | | | | 264/277 |
| 4,556,440 A * | 12/1985 | Krueger | ................... | D04H 3/04 |
| | | | | 156/181 |
| 4,721,645 A * | 1/1988 | Brazel | .................... | B29C 70/24 |
| | | | | 428/113 |
| 4,790,052 A * | 12/1988 | Olry | ........................ | B29C 33/56 |
| | | | | 28/143 |
| 4,943,334 A * | 7/1990 | Medney | ............... | H05K 1/0366 |
| | | | | 156/169 |
| 4,966,527 A * | 10/1990 | Merz | ........................ | B63H 1/26 |
| | | | | 416/241 A |
| 4,980,217 A * | 12/1990 | Grundfest | ............. | H05K 1/115 |
| | | | | 428/209 |
| 5,076,330 A * | 12/1991 | Kimbara | ............... | D03D 41/004 |
| | | | | 428/113 |
| 5,173,138 A * | 12/1992 | Blauch | .................... | B29C 70/30 |
| | | | | 156/266 |
| 5,269,863 A * | 12/1993 | Middelman | .......... | H05K 1/0366 |
| | | | | 66/84 R |
| 5,800,672 A * | 9/1998 | Boyce | ................... | B29C 70/023 |
| | | | | 156/92 |
| 6,585,842 B1 * | 7/2003 | Bompard | .............. | B29C 70/202 |
| | | | | 156/273.1 |
| 9,180,623 B1 * | 11/2015 | Iliev | ........................... | F41H 5/04 |
| 2009/0148647 A1 * | 6/2009 | Jones | ........................ | B64F 5/10 |
| | | | | 156/159 |
| 2012/0220179 A1 * | 8/2012 | Nakase | .................... | B29B 11/16 |
| | | | | 87/8 |
| 2014/0035195 A1 * | 2/2014 | Gottinger | ................ | B29C 70/56 |
| | | | | 264/258 |
| 2014/0262047 A1 * | 9/2014 | Hollander | ............... | B29C 70/24 |
| | | | | 156/393 |
| 2017/0326809 A1 * | 11/2017 | Nishimura | ............... | B29C 65/02 |
| 2020/0215767 A1 * | 7/2020 | Danninger | .............. | B29C 70/38 |

FOREIGN PATENT DOCUMENTS

| | | |
|---|---|---|
| CN | 107364154 B | 2/2019 |
| CN | 110293679 A | 10/2019 |
| DE | 4323761 A1 | 1/1995 |
| GB | 1182671 A | 3/1970 |
| JP | H10166463 A | 6/1998 |

* cited by examiner

APPARATUS AND METHOD FOR EFFICIENTLY PREPARING MULTI-DIRECTIONAL CONTINUOUS FIBER-REINFORCED COMPOSITE MATERIAL

CROSS-REFERENCE TO RELATED APPLICATIONS

This application claims the benefit of priority from Chinese Patent Application No. 202011057701.0, filed on Sep. 30, 2020. The content of the aforementioned application, including any intervening amendments thereto, is incorporated herein by reference in its entirety.

TECHNICAL FIELD

The present application relates to preparation of composite materials, and more particularly to an apparatus and a method for efficiently preparing a multi-directional continuous fiber-reinforced composite material.

BACKGROUND

Continuous fiber-reinforced composite materials are prepared from continuous fiber materials, such as glass fibers, carbon fibers, aramid fibers, etc., and a substrate material (such as ceramic powder) through winding, molding, or pultrusion. The continuous fibers are controllable in the distribution state and mode, and their mechanical properties are far superior to chopped fibers. However, it has still not been reported yet about the device for efficiently preparing multi-directional continuous fiber-reinforced composite materials and the method for controlling the distribution of fibers. Meanwhile, the existing manufacture devices of continuous fiber-reinforced composites cannot complete the automatic fiber cutting, real-time pre-pressing and rapid mold replacement, failing to achieve the precise and efficient preparation. In view of the above-mentioned defects in the prior art, the preparation and application of continuous fiber-reinforced composite materials with excellent mechanical properties are greatly limited.

SUMMARY

An object of this disclosure is to provide an apparatus and a method for efficiently and automatically preparing a multi-directional continuous fiber-reinforced composite material with controllable angle, number of layers and content of fibers.

Technical solutions of the disclosure are described as follows.

In a first aspect, this application provides an apparatus for preparing a multi-directional continuous fiber-reinforced composite material, comprising:

an electrostatic fiber-splitting device;

a powder spreading device; and a pre-press molding device;

wherein the electrostatic fiber-splitting device is configured to controllably split a fiber; the powder spreading device is configured to spread a powder; and the pre-press molding device is configured to cut the fiber and compact the powder; the electrostatic splitting device comprises a hollow shaft, a fiber-splitting table and a rotating table; the hollow shaft, the fiber-splitting table and the rotating table are arranged coaxially; the rotating table is fixedly arranged on the hollow shaft; the fiber-splitting table is fixedly provided on a first support plate; an upper end of the hollow shaft is connected to the first support plate through a first mounted bearing; and a lower end of the hollow shaft is connected to a second supporting plate through a second mounted bearing;

the rotating table is provided with a pre-pressing hole; and two sides of the pre-pressing hole are respectively provided with a pressing device configured to press a fiber bundle;

the fiber-splitting table is fixedly provided with a first rack and a second rack; a first pressing plate is arranged on the first rack through a first spring; and a second pressing plate is arranged on the second rack through a second spring; and a first conductive block is arranged below the first rack; a second conductive block is arranged below the second rack; two sides of the first conductive block are respectively provided with a first electromagnet; and two sides of the second conductive block are respectively provided with a second electromagnet.

In some embodiments, the pressing device comprises a third rack; the third rack is threadedly connected to a screw rod; and a lower end of the screw rod is provided with a pressing block.

In some embodiments, the pre-press molding device comprises an eccentric wheel, an eccentric wheel shaft, a push rod and a quick-change forming mold; the eccentric wheel is sleeved on the eccentric wheel shaft; the eccentric wheel shaft is configured to be driven by a power device; and the push rod is connected to a quick-change male die of the quick-change forming mold through a pin.

In some embodiments, the quick-change forming mold comprises the quick-change male die, a first sleeve barrel, a backing plate and a female die cavity; the first sleeve barrel, the backing plate and the female die cavity are all arranged in the hollow shaft; the female die cavity is a hollow cylinder; the backing plate is in a shape of boss, and comprises a cylinder at an upper portion and a base plate at a lower portion; an outer diameter of the base plate is smaller than an inner diameter of the hollow shaft; an outer diameter of the cylinder of the backing plate is the same as an inner diameter of the female die cavity; an inner cavity formed between the cylinder of the backing plate and the female die cavity is configured to accommodate a preform of the multi-directional continuous fiber-reinforced composite material; the backing plate is arranged in a groove on an upper end of the first sleeve barrel through transition fit; the female die cavity is arranged on a boss located in an inner cavity of the hollow shaft; and the inner cavity of the hollow shaft is in clearance fit with an outer wall of the first sleeve barrel.

In some embodiments, one end of the eccentric wheel shaft is arranged on a third rack through a first bearing, and the other end of the eccentric wheel shaft is arranged on a fourth rack through a second bearing; a lower end of the third rack is connected to a first guide pillar, and a lower end of the fourth rack is connected to a second guide pillar; a first guide sleeve is sleeved on the first guide pillar and is configured to slide on the first guide pillar; and a second guide sleeve is sleeved on the second guide pillar and is configured to slide on the second guide pillar; an upper part of the first guide sleeve and an upper part the second guide sleeve are both connected to a connecting plate; one side of the connecting plate is provided with a first ring-shaped hook, and the other side of the connecting plate is provided with a second ring-shaped hook; an outer side of the third rack is provided with a third ring-shaped hook; an outer side of the fourth rack is provided with a fourth ring-shaped hook; a first tension spring is connected between the first ring-shaped hook and the third ring-shaped hook; and a second tension spring is connected between the second ring-shaped hook and the fourth ring-shaped hook.

In some embodiments, the powder spreading device comprises a powder storage box and a ball screw module; and the powder storage box is arranged on the ball screw module; a lower end of the powder storage box is provided with a powder outlet; a gear is arranged at the powder outlet; a gear shaft is arranged in the powder storage box; the gear is provided on the gear shaft; an addendum circle of the gear is in transition fit with an inner wall of the powder storage box; two sides of the gear closely fit the inner wall of the powder storage box; and a scraper is fixedly arranged on a rear side of the powder storage box.

In some embodiments, the electrostatic fiber-splitting device is arranged on a support component; and the support component is arranged on a guide rail.

In a second aspect, this disclosure provides a method for efficiently preparing the multi-directional continuous fiber-reinforced composite material by using the above apparatus, comprising:

(1) feeding powder into a powder storage box of the powder spreading device;

(2) moving a backing plate of the pre-press molding device such that an upper surface of the backing plate is located below an upper surface of the rotating table, and a distance between the upper surface of the backing plate and the upper surface of the rotating table is equal to a thickness of a single layer of the powder;

(3) moving the powder storage box of the powder spreading device to a side of the backing plate such that a distance between a lower end of a gear of the powder storage box and the upper surface of the rotating table is 1-2 cm;

(4) discharging the powder from the powder storage box; and simultaneously, horizontally moving the powder storage box to uniformly spread the powder into an inner cavity formed by the backing plate and a female die cavity of the pre-press molding device;

(5) placing a first end of a first fiber bundle horizontally in a groove of the first conductive block, and placing a second end of the first fiber bundle in a groove of the second conductive block; powering on the first electromagnet such that the first pressing plate is attracted by the first electromagnet, and at this time, a first spring assembly is stretched and the first pressing plate closely fits the first conductive block to fix the first end of the first fiber bundle;

(6) powering on the first conductive block and the first pressing plate such that an electrostatic field is formed between the first conductive block and the first pressing plate to disperse the second end of the first fiber bundle;

(7) powering on the second electromagnet such that the second pressing plate is attracted by the second electromagnet to stretch a second spring assembly such that the second pressing plate closely fits the second conductive block to fix the second end of the first fiber bundle; and powering off the first conductive block and the first pressing plate;

(8) powering off the first electromagnet, and powering on the second conductive block and the second pressing plate such that an electrostatic field is formed between the second conductive block and the second pressing plate to disperse the first end of the first fiber bundle;

(9) pressing, by the pressing device, the first end and the second end of the first fiber bundle in a monofilament state such that the first end and the second end of the first fiber bundle are both fixed; and then powering off the second electromagnet, the second conductive block and the second pressing plate;

(10) rotating the hollow shaft by a such that the first fiber bundle is rotated by the preset angle α relative to the first pressing plate and the second pressing plate;

(11) placing a first end of a second fiber bundle in the groove of the first conductive block, and placing a second end of the second fiber bundle in the groove of the second conductive block; repeating steps (5)-(8); and then powering off the second conductive block and the second pressing plate;

(12) powering on the first electromagnet; and repeating step (5) such that the first end and the second end of the second fiber bundle in an monofilament state are both fixed;

(13) allowing the electrostatic splitting device to slide to a position where the female die cavity is coaxial with the pre-pressing molding device;

(14) cutting a fiber along an inner wall of the female die cavity and compacting the fiber and the powder via the pre-pressing molding device;

(15) repeating step (2) such that a distance between an upper surface of a fiber-powder composite material in the female die cavity and the upper surface of the rotating table is equal to the thickness of a single layer of the powder, and the upper surface of the fiber-powder composite material is located below the upper surface of the rotating table;

(16) repeating steps (3)-(15) until the number of layers of the powder is one less than that in the desired multi-directional continuous fiber-reinforced composite material;

(17) repeating step (3), step (4), and step (13) in sequence;

(18) performing, by the pre-press molding device, pre-pressing of a last layer of the powder to obtain a preform; and

(19) repeating step (2) to allow the backing plate to move upward; collecting the preform, and subjecting a graphite mold and the preform in the graphite mold to sintering in a hot-pressing furnace to obtain the multi-directional continuous fiber-reinforced composite material.

In an embodiment, the powder is ceramic powder.

Compared with the prior art, the disclosure has the following beneficial effects.

In the apparatus provided herein, a rotatable fiber-splitting table is designed provided, and an electromagnet is employed to control the pressing plate. Through energizing the pressing plate, a high-voltage electrostatic field is generated to disperse the continuous fiber bundle into monofilament fibers. The hollow shaft is rotated at any angle to realize the efficient and directional splitting of continuous fibers with different arrangement modes, so that the arrangement angle (orthogonal/oblique crossing), the number of layers (single layer/multi-layer) and content of the powder can be controlled, achieving the efficient preparation of the continuous fiber-reinforced composite materials with different fiber angles, layer numbers and powder contents. Compared with the existing preparation methods such as slurry impregnation, the method provided herein reduces the occurrence of coalesced filaments in the fibers, and the fiber spacing can be reduced from 1 mm to 0.2 mm compared to the composite material made by manual arrangement, which increases the fiber content per unit volume of the composite material, and makes the mechanical properties of the composite material excellent and controllable.

The apparatus uses the quick-change forming mold to simultaneously complete the fiber cutting and powder pre-pressing. The male die in the quick-change forming mold can be quickly replaced by plugging or pulling the pin to achieve the preparation of composite materials with various shapes and sizes. Through the special die design provided herein, the backing plate, the female die cavity, and the internal powder can be quickly removed from the apparatus simultaneously, shortening the replacement time and greatly improving the preparation efficiency and applicability of the composite material. The apparatus is suitable for the small-batch preparation of multi-size composite materials.

In the apparatus, an upper part of the first guide sleeve and an upper part of the second guide sleeve are fixedly connected to the first connecting plate; one side of the first connecting plate is provided with the first ring-shaped hook, and the other side of the first connecting plate is provided with the second ring-shaped hook; an outer side of the third rack is provided with the third ring-shaped hook; an outer side of the fourth rack is provided with the fourth ring-shaped hook; a first tension spring is connected between the first ring-shaped hook and the third ring-shaped hook; a second tension spring is connected between the second ring-shaped hook and the fourth ring-shaped hook; and the eccentric wheel drives the push rod embedded in the first connecting plate to move up and down, so that the quick-change male die connected to the push rod can compact the powder and cut the fiber. Moreover, one end of the tension spring is hung on a ring-shaped hook on a rack, and the other end of the tension spring is hung on a ring-shaped hook on the first connecting plate embedded in a guide sleeve, so that the tension spring can play a role in resetting the push rod and the quick-change male die.

The apparatus provided herein uses a programmable logic controller (PLC) to control the whole power system (the power devices 1-7). The program can be modified to realize the preparation of composite materials with different shapes and sizes, enabling the efficient, stable and automatic operation of the device and reducing the production cost.

In the method provided herein, the fiber bundle is charged with the same charges under the effect of the high-voltage electric field, and the fibers repel each other to be separated according to the principle of "like charges repel". This method can efficiently separate the fiber bundle into monofilaments compared with the manual operation.

Figure 1:
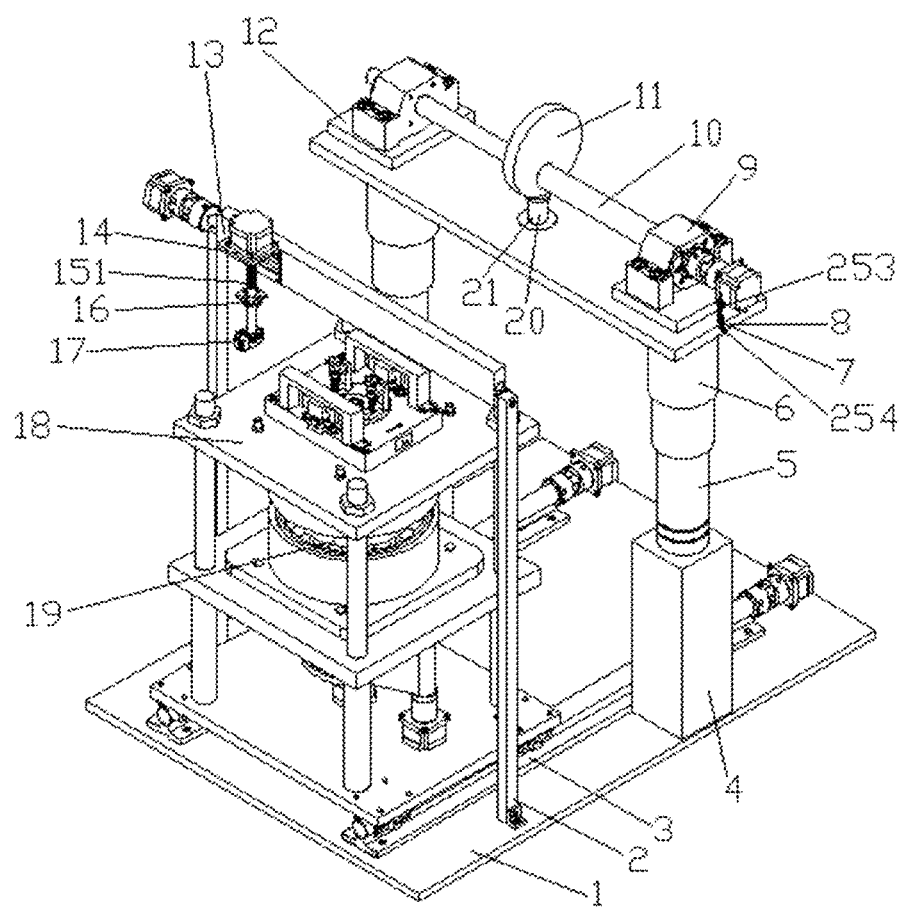
FIG. 1 schematically shows an overall structure of an apparatus for preparing a continuous fiber-reinforced composite material according to an embodiment of the disclosure.

In the drawings: 1, bottom plate; 2, second connecting plate; 3, second guide rail; 4, seventh rack; 5, first guide pillar; 6, first guide sleeve; 7, first tension spring; 8, third connecting plate; 9, first bearing seat; 10, eccentric wheel shaft; 11, eccentric wheel; 12, fifth rack; 13, ball screw module; 131, lead screw; 132, first guide rail; 133, first slide block; 134, second power device; 135, second nut; 14, first connecting plate; 151, first screw rod; 152, first nut; 16, first sleeve barrel; 17, powder storage box; 18, support component; 181, third support plate; 182, second support plate; 183, upright post; 184, first support plate; 19, bearing with housing; 191, first mounted bearing; 192, second mounted bearing; 20, push rod; 21, pin; 22, quick-change male die; 23, sixth rack; 24, synchronous belt; 251, third ring-shaped hook; 252, first ring-shaped hook; 253, second ring-shaped hook; 254, fourth ring-shaped hook; 26, second slide block; 27, first synchronous belt wheel; 28, second synchronous belt wheel; 29, first rack; 30, third rack; 311, first handle; 312, second handle; 321, second screw rod; 322, third screw rod; 331, first pressing block; 332, second pressing block; 34, powder storage box; 35, gear; 36, gear shaft; 37, scraper; 38, third power device; 39, first power device; 401, first electromagnet; 402, second electromagnet; 411, first conductive block; 412, second conductive block; 421, first pressing plate; 422, second pressing plate; 431, first spring assembly; 432, second spring assembly; 44, rotating table; 45, fiber-splitting table; 461, fourth screw rod; 462, third nut; 47, second sleeve barrel; 48, backing plate; 49, female die cavity; 50, seventh power device; 51, second bearing seat; 52, second tension spring; 53, fourth power device; 54, third power device; 55, fifth power device; 56, second guide sleeve; 57, second guide pillar; 58, eighth rack; 59, fourth rack; 60, hollow shaft; 61, second rack; 62, synchronous belt wheel shaft; 63, first expansion sleeve; 64, second expansion sleeve; 66, first groove; 67, second groove; 68, boss; 69, preform; and 70, base plate.

DETAILED DESCRIPTION OF EMBODIMENTS

To render the objects and the technical solutions of the present disclosure clearer and easier to understand, the disclosure will be described in detail below with reference to the drawings and embodiments. It is apparent that the embodiments provided below are merely illustrative of the disclosure and are not intended to limit the disclosure.

As used herein, the orientation or position relationship indicated by the terms, such as "center", "longitudinal", "transverse", "up", "down", "front", "back", "left", "right", "vertical", "horizontal", "top", "bottom", "inside" and "outside", is based on the orientation or position relationship shown in the drawings. These terms are only to facilitate and simplify the description of the present disclosure, and not to indicate or imply that the device or component referred to must have a specific orientation, or be configured and operated in a particular orientation. Therefore, these terms cannot be understood as a limitation to the present disclosure. In addition, the terms "first" and "second" are merely descriptive and are not understood to indicate or imply a relative importance or the number of the technical features referred to. Thus, a feature defined by "first" or "second" may explicitly or implicitly includes one or more of the features. As used herein, unless otherwise stated, the term "a plurality of" means two or more. As used herein, it should be noted that, unless otherwise specified, the terms "arranged", "jointed" and "connected" should be understood in a broad sense, for example, the connection can be fixed connection, detachable connection, or integrated connection; mechanical connection or electrical connection; direct connection or indirect connection through an intermediate medium; or communication between internals of two components. For those skilled in the art, the meanings of the above terms can be determined according to the specific circumstances.

Figure 2:
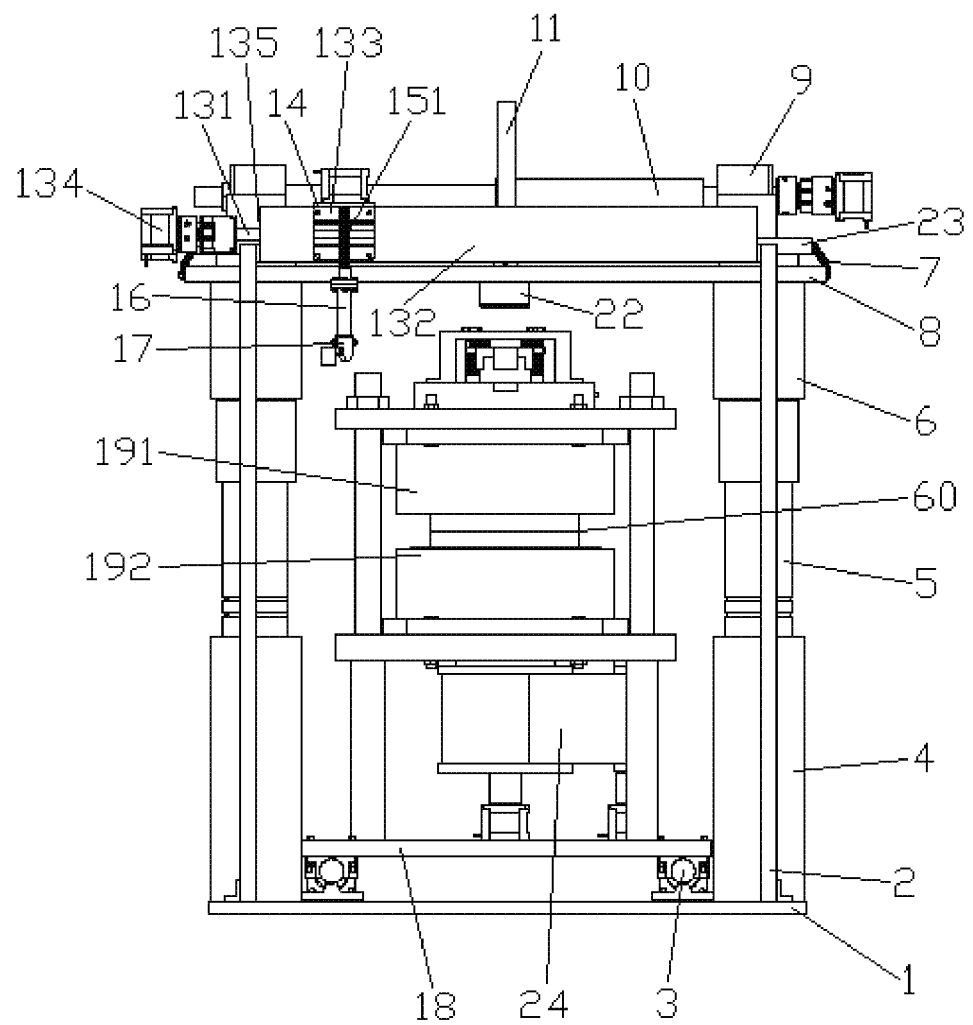
FIG. 2 is a front view of the apparatus according to an embodiment of the disclosure.

Referring to FIGS. 1-2, an apparatus for preparing a multi-directional continuous fiber-reinforced composite material includes an electrostatic fiber-splitting device configured to controllably split a fiber. An upper side of the electrostatic fiber-splitting device is provided with a powder spreading device configured to spread powder. A rear side of the electrostatic fiber-splitting device is provided with a pre-press molding device configured to cut the fiber and compact the powder.

Figure 3:
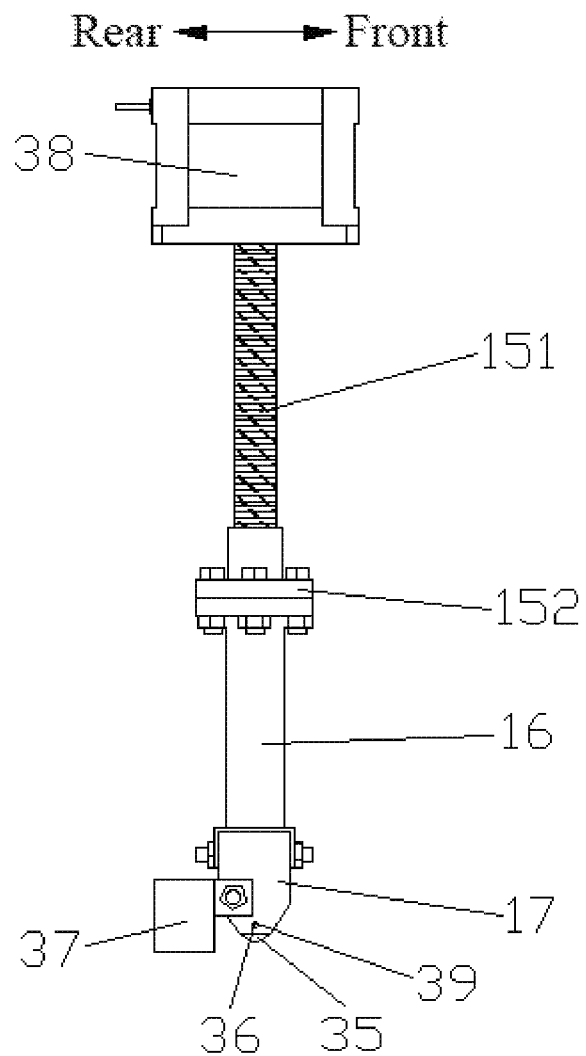
FIG. 3 shows a partial structure of a powder spreading device.

Referring to FIGS. 1-3, the powder spreading device includes a powder storage box 17, a gear 35, a gear shaft 36, a scraper 37 and a lead screw 131. A lower end of the powder storage box 17 is provided with a powder outlet, and the gear 35 is arranged at the powder outlet. Two circular through holes are oppositely arranged on the left and right side walls of the powder storage box 17, and the center of the circular through hole is located on the centerline in the vertical direction of a side wall of the powder storage box 17. The gear shaft 36 is coaxial with the two circular through holes, and passes through the two circular through holes to connect to the powder storage box 17. The gear 35 and the gear shaft 36 are coaxially arranged. An addendum circle of the gear 35 is in transition fit with an inner wall of the powder storage box 17, and two sides of the gear 35 closely fit the inner wall of the powder storage box 17. An end of the gear shaft 36 is connected to a first power device 39. The scraper 37 is fixedly arranged on a rear side of the powder storage box 17. When the powder spreading device operates, a lower edge of the scraper 37 is flush with an edge at an ideal powder thickness. After the powder storage box 17 discharges powder, the scraper 37 operates for powder scraping, which can scrape off the excess powder outside of a female die cavity, gather the excess powder together, make the thickness of the powder under control, and improve the flatness of an upper layer of the powder. An upper part of the powder storage box 17 is fixedly connected to a first sleeve barrel 16. A first nut 152 is fixedly arranged on the upper part of the first sleeve barrel 16 and coaxial with the first sleeve barrel 16. A first screw rod 151 is connected to the first nut 152 through a thread. The first nut 152 is removable up and down along an axis of the first screw rod 151. The first screw rod 151 is arranged at a power output end of a third power device 38.

A ball screw module 13 includes the lead screw 131, a first guide rail 132, a first slide block 133, a second power device 134 and a second nut 135. The second nut 135 and the lead screw 131 are spirally transmitted. The second nut 135 can move along an axis of the lead screw 131. The second nut 135 is fixedly provided on the first guide rail 132. The first guide rail 132 is provided with the first slide block 133. The first slide block 133 can move along the first guide rail 132. A first connecting plate 14 is fixedly connected to the first slide block 133, and is provided with a circular through hole at the center. The first screw rod 151 is coaxial and overfitted with the circular through hole. A third power device 38 is directly connected to the first screw rod 151. An end of the lead screw 131 is arranged at a power output end of the second power device 134. Two second guide rails 3 are respectively provided on two sides of an upper end of the bottom plate 1. Outer sides of the two second guide rails 3 are respectively provided with a second connecting plate 2.

A lower end of the second connecting plate 2 is fixedly provided on the bottom plate 1. An upper end of the second connecting plate 2 is connected to the first guide rail 132.

Figure 4:
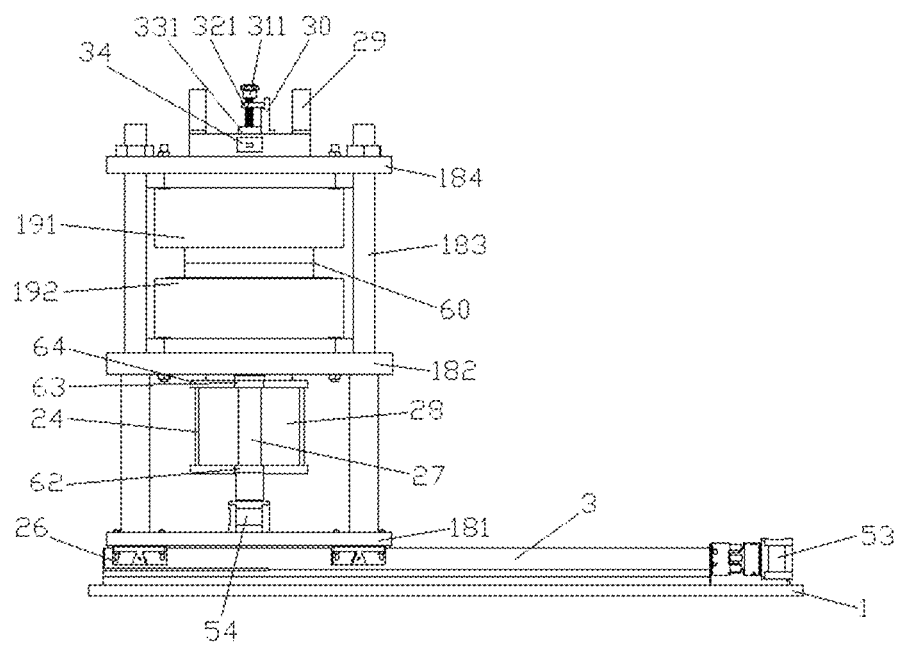
FIG. 4 is a structural diagram of an electrostatic fiber-splitting device.
Figure 5:
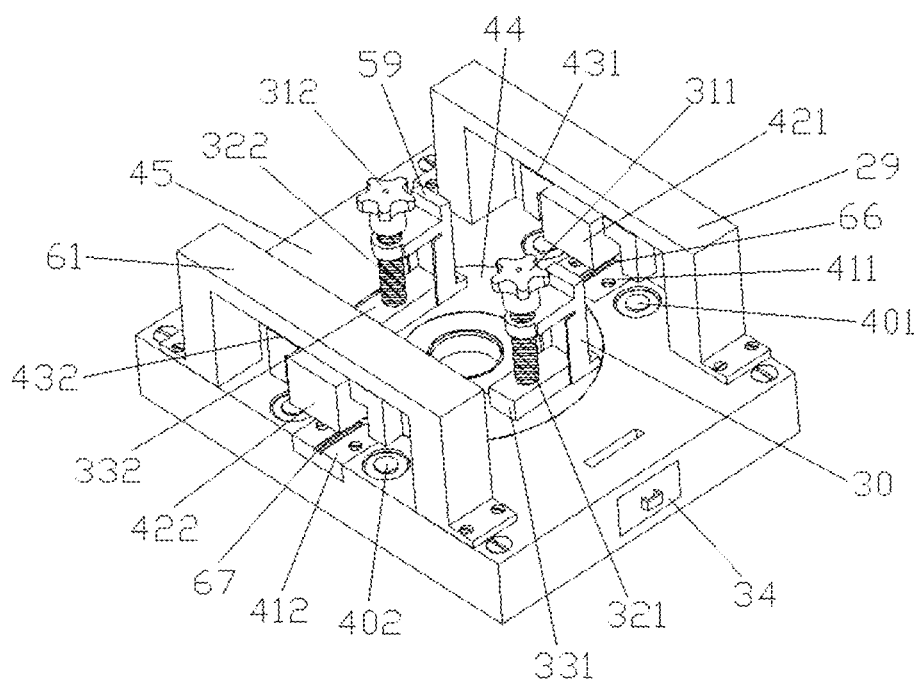
FIG. 5 schematically shows a structure of an electrostatic fiber-splitting platform.

Referring to FIGS. 4-5, the electrostatic fiber-splitting device includes a hollow shaft 60, a fiber-splitting table 45, a rotating table 44, a first pressing plate 421, a second pressing plate 422, a first pressing block 331, a second pressing block 332, a first conductive block 411, a second conductive block 412, a first electromagnet 401 and a second electromagnet 402. The rotating table 44 is fixedly arranged on the hollow shaft 60, and is coaxial with the hollow shaft 60. The fiber-splitting table 45 and the rotating table 44 are coaxially arranged. The fiber-splitting table 45 fixedly provided on a first support plate 184. The hollow shaft 60 is arranged under the fiber-splitting table 45. An upper end of the hollow shaft 60 is supported by a first mounted bearing 191, and a lower end of the hollow shaft 60 is supported by a second mounted bearing 192. An upper end of the first mounted bearing 191 is fixedly connected to the first support plate 184. A lower end of the second mounted bearing 192 is fixedly connected to a second support plate 182. The first mounted bearing 191 and the second mounted bearing together form a mounted bearing assembly.

A third power device 54 is arranged on a third support plate 181. A power output shaft of the third power device 54 is fixedly connected to a synchronous belt wheel shaft 62. A first synchronous belt wheel 27 is tightly connected to the synchronous belt wheel shaft 62 through a first expansion sleeve 63. A second synchronous belt wheel 28 is connected to the first synchronous belt wheel 27 through a synchronous belt 24. The second synchronous belt wheel 28 is coaxial with the hollow shaft 60, and is tightly connected to the hollow shaft 60 through a second expansion sleeve 64. An axis of the synchronous belt wheel shaft 62 is parallel to an axis of the hollow shaft 60. A support component includes a plurality of upright posts 183, the first support plate 184, the second support plate 182, and a third support plate 181, where the first support plate 184, the second support plate 182, and the third support plate 183 are arranged coaxially and in parallel. The plurality of upright posts 183 are arranged between the first support plate 184 and the second support plate 182, and between the second support plate 182 and the third support plate 181 for support. The bottom plate 1 is provided with two second guide rails 3. An end of the second guide rail 3 is connected to a fourth power device 53. The second guide rail 3 is provided with a plurality of second slide blocks 26. Each of the plurality of second slide blocks 26 can slide on the second guide rail 3. The third support plate 181 is arranged on the second slide blocks 26.

The first pressing plate 421 is connected to a first rack 29 through a first spring assembly 431. The first spring assembly 431 includes two springs. One side of an upper end of the fiber-splitting table 45 is fixedly provided with the first rack 29, and the other side of an upper end of the fiber-splitting table 45 is fixedly provided with a second rack 61. The second pressing plate 422 is fixedly connected to the second rack 61 through a second spring assembly 432, and is located above the fiber-splitting table 45. The second pressing plate 422 is made of a conductive material (such as steel and aluminum). One side of the fiber-splitting table 45 is provided with a first mounting groove, and the other side of the fiber-splitting table 45 is provided with a second mounting groove. The first mounting groove is parallel to the first pressing plate 421, and the second mounting groove is parallel to the second pressing plate 422. The first conductive block 411 is arranged in the first mounting groove and located directly below the first pressing plate 421, and the second conductive block 412 is arranged in the second mounting groove and located directly below the second pressing plate 422. The first conductive block 411 is provided with a first groove 66, and the second conductive block 412 is provided with a second groove 67. Two sides of the first conductive block 411 are respectively provided with a cylindrical light hole, and the cylindrical light holes are both provided with a first electromagnet 401. Two sides of the second conductive block 412 are respectively provided with a cylindrical light hole, and the cylindrical light holes are both provided with a second electromagnet 402. The first electromagnet 401 and the second electromagnet 402 are respectively in interference fit with the corresponding cylindrical light hole. A rectangular groove is arranged on a side of the fiber-splitting table 45, and the powder storage box 34 is provided in the rectangular groove. The powder storage box 34 is in transition fit with the rectangular groove, so that the excessive powder can be removed and recycled. A third rack 30 and a fourth rack 59 are respectively arranged on the rotating table 44, and provided with a circular thread through hole. A second screw rod 321 is threadedly connected to the circular thread through hole on the third rack 30, and a third screw rod 322 is threadedly connected to the circular thread through hole on the fourth rack 59. The second screw rod 321 and the third screw rod 322 can move up and down along their respective axes. The first pressing block 331 is fixedly provided on a lower end of the second screw rod 321. The second pressing block 332 is fixedly provided on a lower end of the third screw rod 322. An upper end of the second screw rod 321 is fixedly connected to a first handle 311. An upper end of the third screw rod 322 is fixedly connected to a second handle 312.

Figure 6:
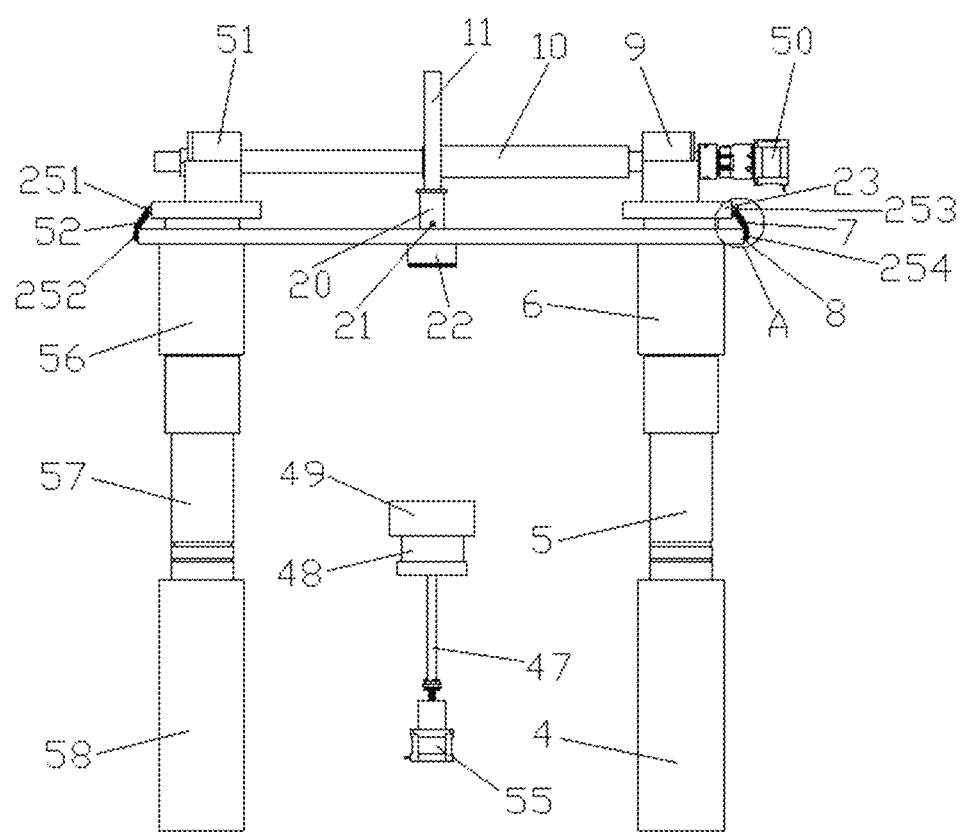
FIG. 6 is a structural diagram of a pre-press molding device.
Figure 7:
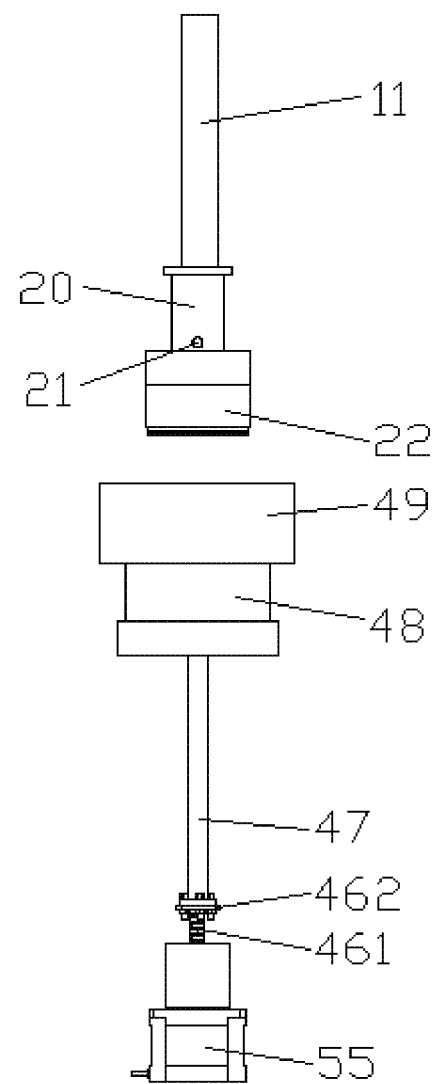
FIG. 7 shows a partial structure of the pre-press molding device.

Referring to FIGS. 6-7, the pre-press molding device includes an eccentric wheel 11, an eccentric wheel shaft 10, a push rod 20 and a quick-change forming mold. A backing plate 48 and a female die cavity 49 are arranged coaxially. An outer diameter of a quick-change male die 22 is the same as an inner diameter of the female die cavity 49. A boss 68 is arranged on an inner cavity of the hollow shaft 60. The female die cavity 49 is loaded into the boss 68 and transitionally fitted with the boss 68. The backing plate 48 is arranged in an upper end of a second sleeve barrel 47 and transitionally arranged in a groove of the second sleeve barrel 47. A lower end of the second sleeve barrel 47 is fixedly connected to a third nut 462. The third nut 462 is coaxial with and threadedly connected to a fourth screw rod 461. The third nut 462 is configured to slide on the fourth screw rod 461. A lower end of the fourth screw rod 461 is arranged on a powder output shaft of a fifth power device 55. The fifth power device 55 is fixedly arranged at the center of the third support plate 181. The quick-change male die 22 is arranged below the push rod 20, and connected to the push rod 20 through a pin 21. It is only required to pull out the pin 21 to complete the mold replacement, allowing for efficient replacement. The eccentric wheel 11 is fixedly connected to the eccentric wheel shaft 10, and tangent to the push rod 20. The eccentric wheel shaft 10 is arranged on a power output shaft of a seventh power device 50. One end of the eccentric wheel shaft 10 is arranged on a first bearing seat 9, and the other end of the eccentric wheel shaft 10 is arranged on a second bearing seat 51. The first bearing seat 9 is fixedly connected to a fifth rack 12. The second bearing seat 51 is fixedly connected to a sixth rack 23. The bottom plate 1 is provided with a first groove and a second groove. A lower end of a seventh rack 4 is embedded in the first groove, and a lower end of an eighth rack 58 is embedded in the second groove. An end of the seventh rack 4 is provided with a groove, and a lower end of a first guide pillar 5 is embedded in the groove. An end of the eighth rack 58 is provided with a groove, and a lower end of a second guide pillar 57 is embedded in the groove. An upper end of the first guide pillar 5 is embedded in the fifth rack 12. An upper end of the second guide pillar 57 is embedded in the sixth rack 23. A first guide sleeve 6 is sleeved on the first guide pillar 5, and can slide on the first guide pillar 5. A second guide sleeve 56 is sleeved on the second guide pillar 57, and can slide on the second guide pillar 57.

A third connecting plate 8 is provided with a first cylindrical through hole, a second cylindrical through hole and a third cylindrical through hole along the central axis. The first guide sleeve 6 is embedded in the first cylindrical through hole; the second guide sleeve 56 is embedded in the second cylindrical through hole; and the push rod 20 is embedded in the third cylindrical through hole. One side of the third connecting plate 8 is provided with a first ring-shaped hook 252, and the other side of the third connecting plate 8 is provided with a second ring-shaped hook 253. An outer side of the fifth rack 12 is provided with a third ring-shaped hook 251. An outer side of the sixth rack 23 is provided with a fourth ring-shaped hook 254. One end of a first tension spring 7 is hung on the second ring-shaped hook 253 on the third connecting plate 8, and the other end of the first tension spring 7 is hung on the fourth ring-shaped hook 254 on the sixth rack 23. One end of a second tension spring 52 is hung on the first ring-shaped hook 252 on the third connecting plate 8, and the other end of the second tension spring 52 is hung on the third ring-shaped hook 251 on the fifth rack 12. The eccentric wheel 11 drives the push rod 20 embedded in the third connecting plate 8 to move up and down, so that the quick-change male die 22 connected to the push rod 20 can press the powder and cut the fiber. One end of a tension spring is hung on a ring-shaped hook on a rack, and the other end of the tension spring is hung on a ring-shaped hook on the third connecting plate 8 embedded in a guide sleeve, playing a role in resetting the push rod 20 and the quick-change male die 22.

Figure 8:
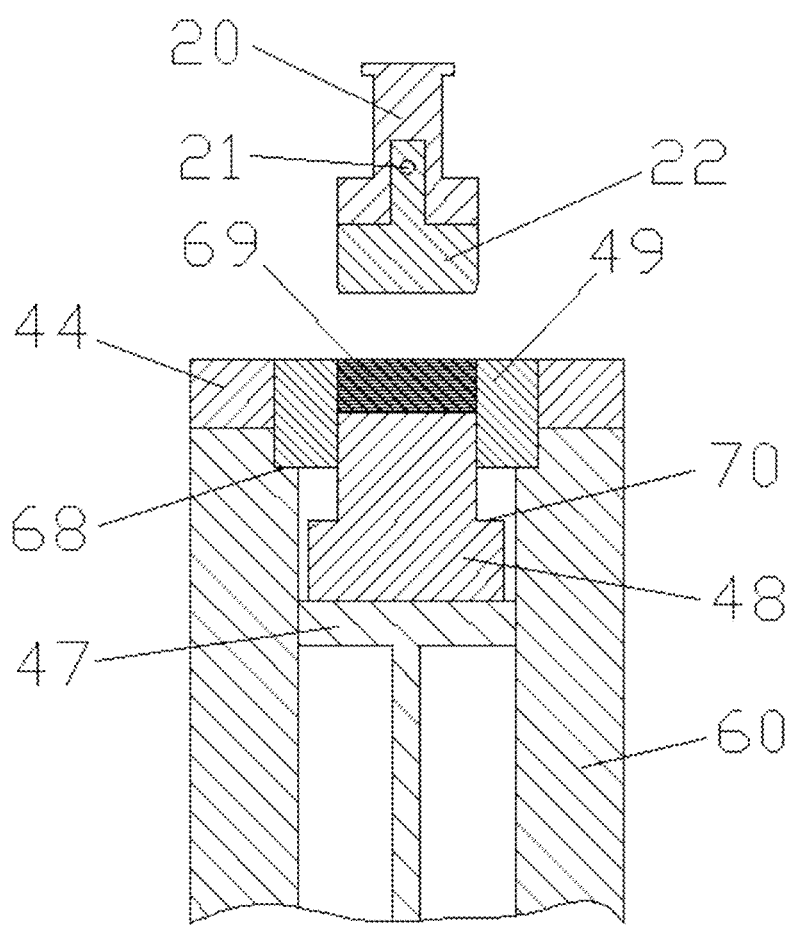
FIG. 8 is a half-sectional view of a quick-change structure.
Figure 9:
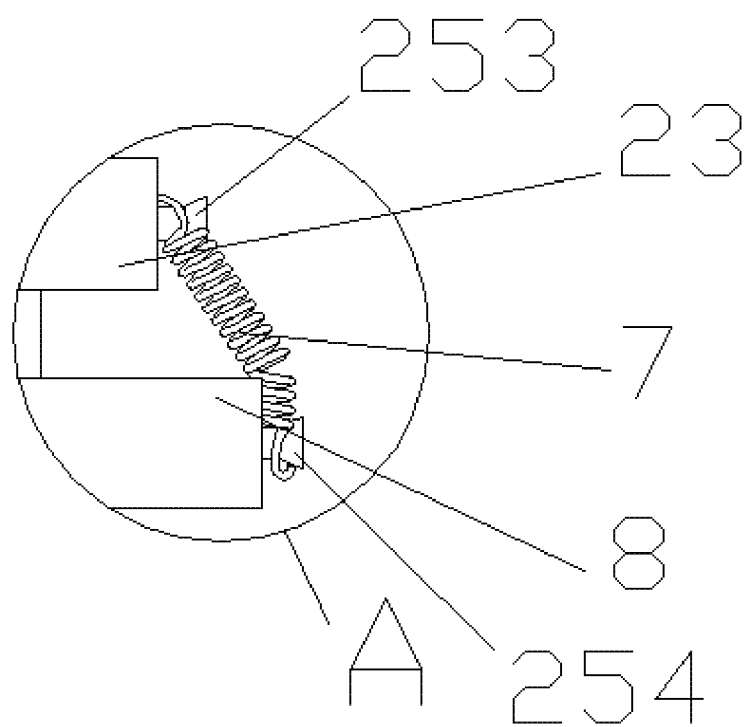
FIG. 9 is a partial enlarged view of part A in FIG. 6.

Referring to FIGS. 7-8, the quick-change forming mold includes the quick-change male die 22, the pin 21, the second sleeve barrel 47, the backing plate 48 and the female die cavity 49. The second sleeve barrel 47, the backing plate 48 and the female die cavity 49 are all arranged in the hollow shaft 60. Both the backing plate 48 and the female die cavity 49 are made of graphite materials. The female die cavity 49 is a hollow cylinder. The backing plate 48 is in a shape of boss, and includes a cylinder at an upper portion and a base plate 70 at a lower portion, where an outer diameter of the base plate 70 is slightly smaller than an inner diameter of the hollow shaft 60; an outer diameter of the cylinder of the backing plate is the same as an inner diameter of the female die cavity 49; and an inner cavity formed between the cylinder of the backing plate and the die mold cavity is configured to accommodate a preform 69 of the multi-directional continuous fiber-reinforced composite material. The backing plate 48 is arranged in a groove on an upper end of the second sleeve barrel 47 through transition fit. The female die cavity 49 is arranged on the boss 68 located in an inner cavity of the hollow shaft 60, and the inner cavity of the hollow shaft 60 is in clearance fit with an outer wall of the second sleeve barrel 47.

The power system of the whole apparatus includes a PLC, a first power device, a second power device, a third power device, a fourth power device, a fifth power device, a sixth power device and a seventh power device, where the first power device is provided with a stepping motor A; the second power device is provided with a stepping motor B; the third power device is provided with a stepping motor C; the fourth power device is provided with a stepping motor D; the fifth power device is provided with a stepping motor E; the sixth power device is provided with a stepping motor F; and the seventh power device is provided with a stepping motor G. During the operation process of the apparatus, the steeping motors A, B, C and E need to be operated forwardly and reversely, and other stepping motors only need to run forward. In order to facilitate controlling the fiber-splitting degree, it is not required to set a program to control the power-on and movement of the pressing plate. The control program of the whole apparatus is divided into five parts, which are specifically described as follows (taking the intra-layer arrangement at any angle as an example).

1. Powder Spreading (1) The stepping motor A is operated forward, and the backing plate 48 is controlled to be lowered until an upper surface of the backing plate 48 is located below an upper surface of the rotating table 44, and a distance between the upper surface of the backing plate 48 and the upper surface of the rotating table 44 is equal to a thickness of a single layer of the powder.

(2) The stepping motor B is operated forward, and the first slide block 133 is controlled to move until a central axis of the gear 35 is aligned with an inner wall of the female die cavity 49.

(3) The stepping motor C is operated forward, and the powder storage box 17 is controlled to move down until a lower surface of the scraper 37 is tangent to the upper surface of the rotating table 44.

(4) The stepping motor D is powered on, and the gear 35 is controlled to rotate for a preset number of turns to reach the required powder feed amount. At the same time, the stepping motor B is operated forward, and the first slide block 133 is controlled to move until the central axis of the gear 35 is moved to the inner wall of the other side of the female die cavity 49.

(5) The stepping motor C is operated reversely, and the powder storage box 17 is controlled to move upward to the original position.

(6) The stepping motor B is operated reversely, and the first slide block 133 is controlled to move back to the original position. Then, the stepping motor B is powered off, and the first fiber-splitting process is performed manually.

2. Rotation of Rotating Table

The stepping motor E is operated in a forward direction and the hollow shaft 60 is controlled to rotate by an angle (0-180°). Then, the stepping motor E is powered off, and the second fiber-splitting process is performed manually.

3. Change of Working Position

The stepping motor F is operated forward, and the second guide rail 3 is controlled to move until a central axis of the backing plate 48 is coaxial with a central axis of the quick-change male die 22.

4. Pre-Pressing Forming

The stepping motor F is powered on, and the eccentric wheel 11 is controlled to turn for a few seconds until the quick-change male die 22 cuts off the fiber along the inner wall of the female die cavity 49 and compacts the fiber and the powder.

5. Apparatus Resetting (1) The stepping motor F is operated reversely, and the second guide rail 3 is controlled to move back to the original position.

(2) The stepping motor E is operated reversely, and the hollow shaft 60 is controlled to rotate for an angle (0-180°).

Figure 10:
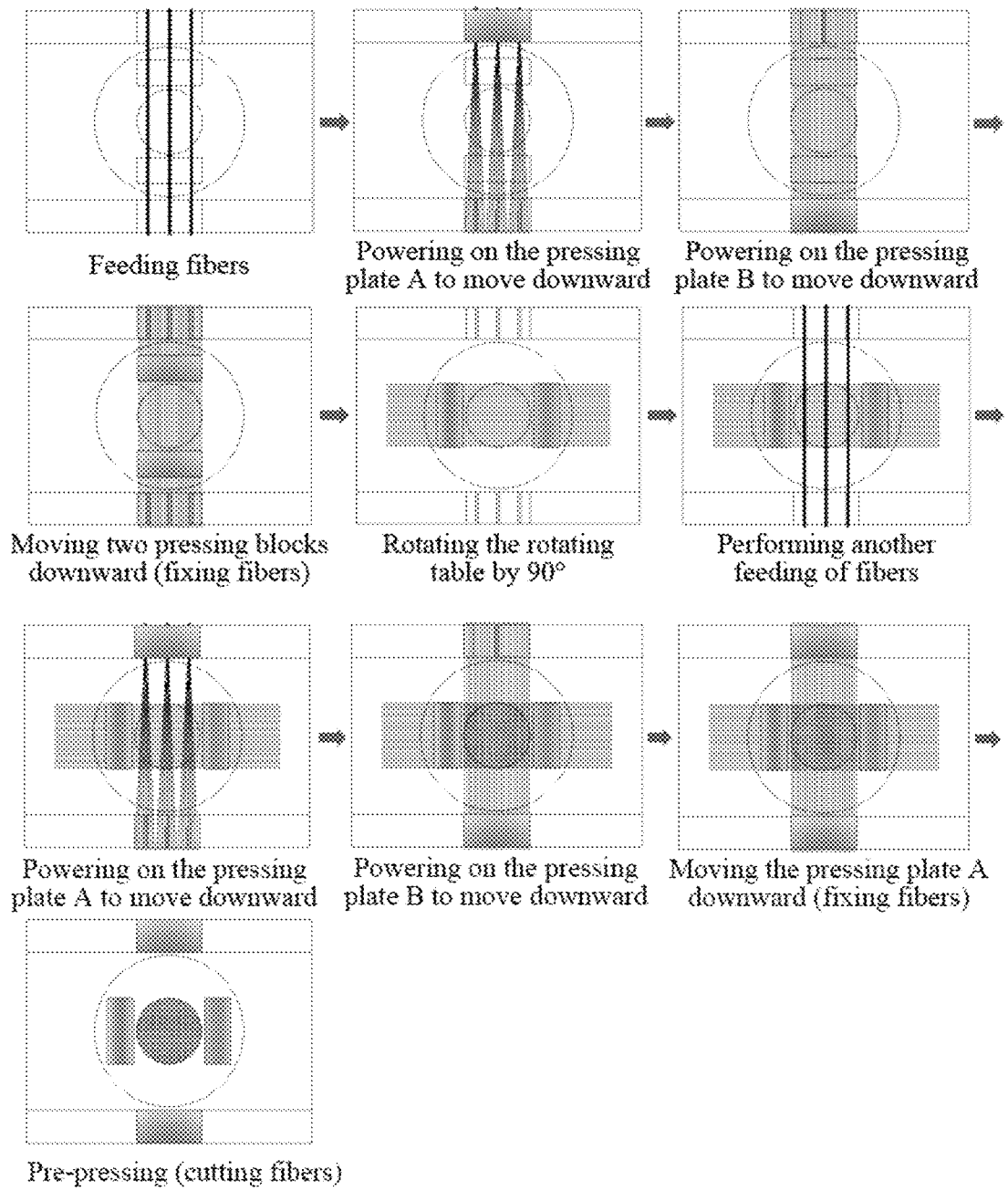
FIG. 10 is a flow chart of preparation of a continuous fiber-reinforced composite material with intra-layer orthogonal arrangement of fibers.

Embodiment 1 Preparation of a Continuous Fiber-Reinforced Composite Material with Intra-Layer Orthogonal Arrangement of Fiber Bundles Referring to FIG. 10, a method for preparing the multi-directional continuous fiber-reinforced composite material using the above-mentioned apparatus is provided, which is described below.

(1) The apparatus is assembled, and the ceramic powder is fed into the powder storage box 17.

(2) The fifth power device 55 is powered on, and the stepping motor A is operated in a forward direction to drive the fourth screw rod 461 to rotate, so that the third nut 462 moves axially along the fourth screw rod 461. The second sleeve barrel 47 fixedly connected to the third nut 462 moves with the third nut 462. The backing plate 48 arranged in a groove of the second sleeve barrel 47 moves up and down with the second sleeve barrel 47, so that an upper surface of the backing plate 48 is located below an upper surface of the rotating table 44, and a distance between the upper surface of the backing plate 48 and the upper surface of the rotating table 44 is equal to a thickness of a single layer of the powder.

(3) The second power device 134 is powered on, and the stepping motor B is operated forward to drive the lead screw 131 to rotate and the second nut 135 to move axially along the lead screw 131, such that the powder storage box 17 moves along an axis of the lead screw 131 to a side of the female die cavity 49. Then the second power device 134 is powered off and the third power device 38 is powered on, and the stepping motor C is operated forward to drive the first screw rod 151 to rotate, so that the first nut 152 moves axially along the first screw rod 151. The first sleeve barrel 16 fixedly connected to the first nut 152 moves along a vertical direction to drive the powder storage box 17 fixedly connected to the first sleeve 16 to move, such that a distance between a lower end of the gear 35 and the upper surface of the rotating table 44 is 1-2 cm.

(4) The first power device 39 is powered on, and the stepping motor D is operated forward to drive the gear shaft 36 to rotate, and the gear 35 rotates with the gear shaft 36 to drive the powder in the tooth space to fall. At the same time, the second power device 134 is powered on, and the stepping motor B is operated forward to drive the powder storage box 17 to continue to move along an axial direction of the lead screw 131, so that the powder is uniformly spread in a cavity formed by the backing plate 48 and the female die cavity 49. The third rack 30 and the fourth rack 59 drive the first pressing block 331 and the second pressing block 332 to rotate so that the central axes of the first pressing block 331, the second pressing block 332, the first pressing plate 421 and the second pressing plate 422 are in the same line.

(5) A first end of a first fiber bundle is horizontally placed in a first groove 66 of the first conductive block 411, and a second end of the first fiber bundle is horizontally placed in a second groove 67 of the second conductive block 412. The first electromagnet is powered on such that the first pressing plate 421 is attracted by the first electromagnet 401, and at this time, the first spring assembly 431 is stretched, and the first pressing plate 421 closely fits the first conductive block 411 to fix the first end of the first fiber bundle.

(6) The first conductive block 411 and the first pressing plate 421 are powered on such that a high-voltage electrostatic field is formed between the first conductive block 411 and the first pressing plate 421 to disperse the second end of the first fiber bundle.

(7) The second electromagnet 402 is powered on such that the second pressing plate 332 is attracted by the second electromagnet 402 to stretch a second spring assembly 432. The second pressing plate 422 closely fits the second conductive block 412 to fix the second end of the first fiber bundle, and then the first conductive block 411 and the first pressing plate 421 are powered off.

(8) The first electromagnet 401 is powered off, and the second conductive block 412 and the second pressing plate 422 are powered on such that an electrostatic field is formed between the second conductive block 412 and the second pressing plate 422 to disperse the first end of the first fiber bundle.

(9) The first handle 311 and the second handle 312 are rotated manually to drive the second screw rod 321 and the third screw rod 322 to rotate. The first pressing block 331 and the second pressing block 332 are driven to move downward to fit the upper surface of the rotating table 44, so that the first end and second end of the first fiber bundle are both fixed. Then the first electromagnet 402, the second conductive block 412 and the second pressing plate 422 are powered off.

(10) The third power device 54 is powered on, and the stepping motor E is operated forward, so that the synchronous belt wheel shaft 62 rotates to drive the first synchronous belt wheel 27 fixedly connected thereto to rotate, and the synchronous belt 24 moves to drive the second synchronous belt wheel 28 to rotate such that the hollow shaft 60 in expansion connection with the second synchronous belt wheel 28 and the rotating table 44 rotate by 90°, that is, the first fiber bundle is rotated by 90° relative to the first pressing plate 421 and the second pressing plate 422.

(11) A first end of a second fiber bundle is placed in the groove of the first conductive block 411, and a second end of the second fiber bundle is placed in the groove of the second conductive block 422. Steps (5)-(8) are repeated, and then the second conductive block 412 and the second pressing plate 422 are powered off.

(12) The first electromagnet is powered on. The step (5) is repeated such that the first end and the second end of the second fiber bundle in a monofilament state are both fixed.

(13) The fourth power device 53 is powered on, and the stepping motor F is operated forward to drive the second slide block 26 to move along the second guide rail 3, and the electrostatic fiber-splitting device slides to a position where the female die cavity 49 is coaxial with the quick-change male die 22.

(14) The seventh power device 50 is powered on, and the stepping motor G is operated forward. The eccentric wheel shaft 10 rotates to drive the eccentric wheel 11 to rotate. The eccentric wheel 11 pushes the quick-change male die 22 located below the push rod 20 to press downward back and forth to cut off the fiber along the inner wall of the female die cavity 49 and compact the fiber and the powder.

(15) The operations in step (2) are repeated such that a distance between an upper surface of a fiber-powder composite material in the female die cavity 49 and the upper surface of the rotating table 44 is equal to the thickness of a single layer of the powder, and the upper surface of the fiber-powder composite material is located below the upper surface of the rotating table 44.

(16) Steps (3)-(15) are repeated until the number of layers of the powder is one less than that in the desired multi-directional continuous fiber-reinforced composite material.

(17) Step (3), step (4), and step (13) are repeated once in sequence.

(18) The seventh power device 50 drives the quick-change male die 22 to press downward to complete the pre-pressing of the last layer of the powder to obtain a preform 69.

(19) Step (2) is repeated to lift the backing plate 48. The female die cavity 49 is jacked up by the base plate 70 to move up to be above the rotating table 44. A graphite male die is put into the female die cavity 49. The whole set of graphite mold, including the backing plate 48, the female die cavity 49, the graphite male die and the preform 69 of the composite material, can be taken out from the second sleeve barrel 47. Then the graphite mold and the preform therein are subjected to sintering in a hot-pressing furnace to obtain the desired multi-directional continuous fiber-reinforced composite material.

Embodiment 2

Figure 11:
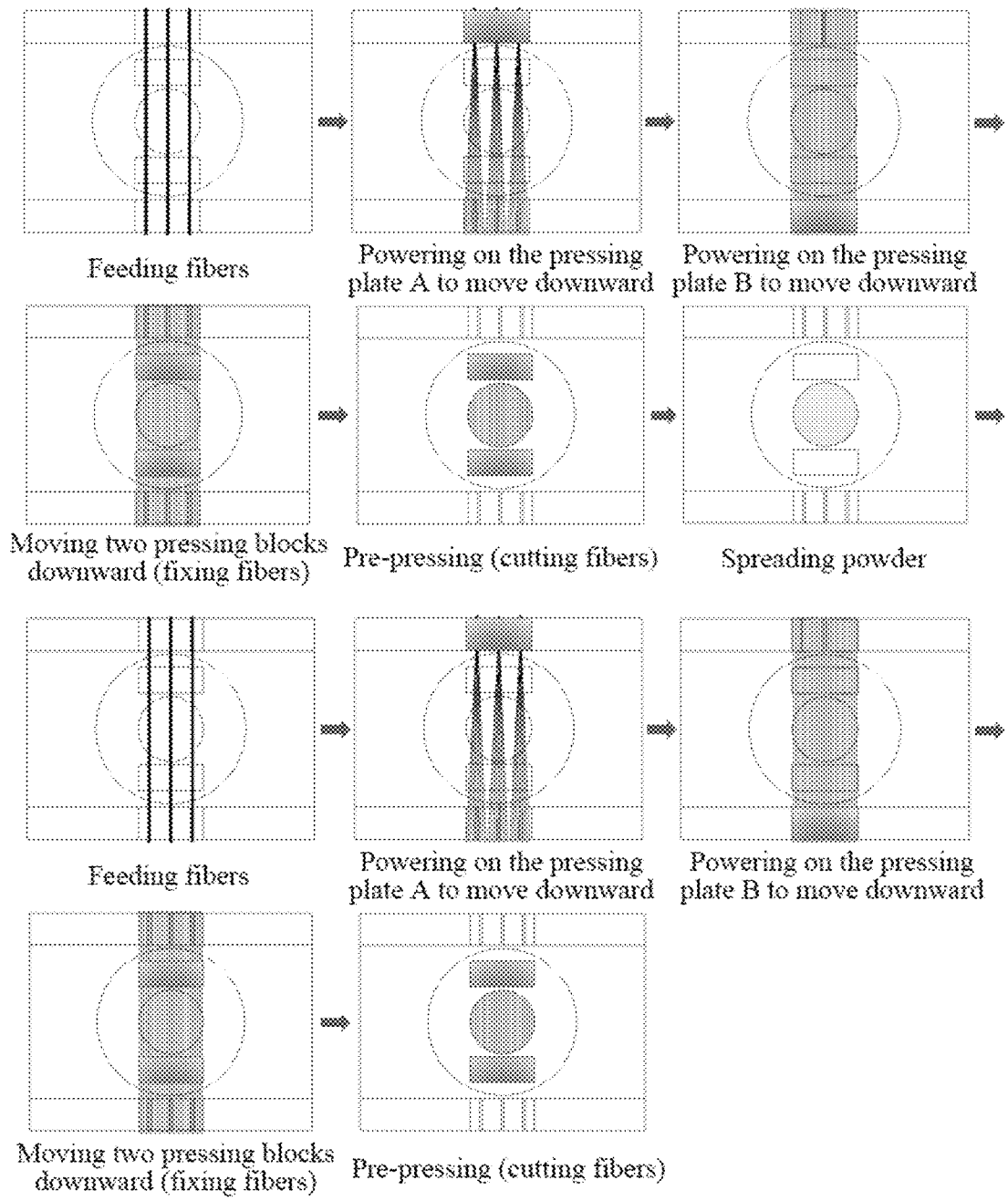
FIG. 11 is a flow chart of preparation of a continuous fiber-reinforced composite material with parallel layers of fibers.

Referring to FIG. 11, a method of preparing a continuous fiber-reinforced composite material with parallel layers of fiber bundles is provided, which is described below.

(1) The operations in steps (1)-(9) in Embodiment 1 are repeated, and at this time, the fiber bundle is arranged in a single direction and is in a monofilament state.

(2) The operations in steps (13)-(16) in Embodiment 1 are repeated, and at this time, the fiber bundles at different layers are parallel to each other.

(3) The steps (17)-(19) in Embodiment 1 are repeated to prepare the preform of the continuous fiber-reinforced composite material with parallel layers of fiber bundles.

The above embodiments are only illustrative of the technical solutions of the present disclosure, and are not intend to limit the present disclosure. It should be noted that any changes, replacements and modifications made by those skilled in the art without departing from the spirit of the disclosure shall fall within the scope of the disclosure defined by the appended claims.

What is claimed is:

1. An apparatus for preparing a multi-directional continuous fiber-reinforced composite material, comprising:
an electrostatic fiber bundle-splitting device;
a powder spreading device; and
a pre-press molding device;
wherein the electrostatic fiber bundle-splitting device is configured to controllably split a fiber; the powder spreading device is configured to spread a powder; and the pre-press molding device is configured to cut the fiber and compact the powder;
the electrostatic fiber bundle-splitting device comprises a hollow shaft, a fiber-splitting table and a rotating table; the hollow shaft, the fiber-splitting table and the rotating table are arranged coaxially; the rotating table is fixedly arranged on the hollow shaft; the fiber-splitting table is fixedly provided on a first support plate; an upper end of the hollow shaft is connected to the first support plate through a first mounted bearing; and a lower end of the hollow shaft is connected to a second supporting plate through a second mounted bearing;
the rotating table is provided with a pre-pressing hole; and two sides of the pre-pressing hole are respectively provided with a pressing device configured to press a fiber bundle;
the fiber-splitting table is fixedly provided with a first rack and a second rack; a first pressing plate is arranged on the first rack through a first spring; and a second pressing plate is arranged on the second rack through a second spring;

a first conductive block is arranged below the first rack; a second conductive block is arranged below the second rack; two sides of the first conductive block are respectively provided with a first electromagnet; and two sides of the second conductive block are respectively provided with a second electromagnet;

the pre-press molding device comprises an eccentric wheel, an eccentric wheel shaft, a push rod and a quick-change forming mold; the eccentric wheel is sleeved on the eccentric wheel shaft; the eccentric wheel shaft is configured to be driven by a power device; and the push rod is connected to a quick-change male die of the quick-change forming mold through a pin;

the quick-change forming mold comprises the quick-change male die, a first sleeve barrel, a backing plate and a female die cavity; the first sleeve barrel, the backing plate and the female die cavity are all arranged in the hollow shaft; the female die cavity is a hollow cylinder; the backing plate is in a shape of boss, and comprises a cylinder at an upper portion and a base plate at a lower portion; an outer diameter of the base plate is smaller than an inner diameter of the hollow shaft; an outer diameter of the cylinder of the backing plate is the same as an inner diameter of the female die cavity; an inner cavity formed between the cylinder of the backing plate and the female die cavity is configured to accommodate a preform of the multi-directional continuous fiber-reinforced composite material; the backing plate is arranged in a groove on an upper end of the first sleeve barrel through transition fit; the female die cavity is arranged on a boss located in an inner cavity of the hollow shaft; and the inner cavity of the hollow shaft is in clearance fit with an outer wall of the first sleeve barrel; and the powder spreading device comprises a powder storage box and a ball screw module; the powder storage box is arranged on the ball screw module; a lower end of the powder storage box is provided with a powder outlet; a gear is arranged at the powder outlet; a gear shaft is arranged in the powder storage box; the gear is provided on the gear shaft; an addendum circle of the gear is in transition fit with an inner wall of the powder storage box; two sides of the gear closely fit the inner wall of the powder storage box; and a scraper is fixedly arranged on a rear side of the powder storage box.

2. The apparatus of claim 1, wherein the pressing device comprises a third rack; the third rack is threadedly connected to a screw rod; and a lower end of the screw rod is provided with a pressing block.

3. The apparatus of claim 1, wherein one end of the eccentric wheel shaft is arranged on a third rack through a first bearing, and the other end of the eccentric wheel shaft is arranged on a fourth rack through a second bearing; a lower end of the third rack is connected to a first guide pillar, and a lower end of the fourth rack is connected to a second guide pillar; a first guide sleeve is sleeved on the first guide pillar and is configured to slide on the first guide pillar; and a second guide sleeve is sleeved on the second guide pillar and is configured to slide on the second guide pillar; and
an upper part of the first guide sleeve and an upper part the second guide sleeve are both connected to a connecting plate; one side of the connecting plate is provided with a first ring-shaped hook, and the other side of the connecting plate is provided with a second ring-shaped hook; an outer side of the third rack is provided with a third ring-shaped hook; an outer side of the fourth rack is provided with a fourth ring-shaped hook; a first tension spring is connected between the first ring-shaped hook and the third ring-shaped hook; and a second tension spring is connected between the second ring-shaped hook and the fourth ring-shaped hook.

4. The apparatus of claim 1, wherein the electrostatic fiber bundle-splitting device is arranged on a support component; and the support component is arranged on a guide rail.

5. A method for preparing a multi-directional continuous fiber-reinforced composite material using the apparatus of claim 1, comprising:
(1) feeding powder into the powder storage box of the powder spreading device;
(2) moving the backing plate of the pre-press molding device such that an upper surface of the backing plate is located below an upper surface of the rotating table, and a distance between the upper surface of the backing plate and the upper surface of the rotating table is equal to a thickness of a single layer of the powder;
(3) moving the powder storage box of the powder spreading device to a side of the backing plate such that a distance between a lower end of the gear of the powder storage box and the upper surface of the rotating table is 1-2 cm;
(4) discharging the powder from the powder storage box; and simultaneously, horizontally moving the powder storage box to uniformly spread the powder into an inner cavity formed by the backing plate and the female die cavity of the pre-press molding device;
(5) placing a first end of a first fiber bundle horizontally in a groove of the first conductive block, and placing a second end of the first fiber bundle in a groove of the second conductive block; powering on the first electromagnet such that the first pressing plate is attracted by the first electromagnet, and at this time, a first spring assembly is stretched and the first pressing plate closely fits the first conductive block to fix the first end of the first fiber bundle;
(6) powering on the first conductive block and the first pressing plate such that an electrostatic field is formed between the first conductive block and the first pressing plate to disperse the second end of the first fiber bundle;
(7) powering on the second electromagnet such that the second pressing plate is attracted by the second electromagnet to stretch a second spring assembly such that the second pressing plate closely fits the second conductive block to fix the second end of the first fiber bundle; and powering off the first conductive block and the first pressing plate;
(8) powering off the first electromagnet, and powering on the second conductive block and the second pressing plate such that an electrostatic field is formed between the second conductive block and the second pressing plate to disperse the first end of the first fiber bundle;
(9) pressing, by the pressing device, the first end and the second end of the first fiber bundle in a monofilament state such that the first end and the second end of the first fiber bundle are both fixed; and then powering off the second electromagnet, the second conductive block and the second pressing plate;
(10) rotating the hollow shaft by a such that the first fiber bundle is rotated by a preset angle α relative to the first pressing plate and the second pressing plate;
(11) placing a first end of a second fiber bundle in the groove of the first conductive block, and placing a second end of the second fiber bundle in the groove of the second conductive block; repeating steps (5)-(8); and then powering off the second conductive block and the second pressing plate;

(12) powering on the first electromagnet; and repeating step (5) such that the first end and the second end of the second fiber bundle in an monofilament state are both fixed;

(13) allowing the electrostatic fiber bundle-splitting device to slide to a position where the female die cavity is coaxial with the pre-pressing molding device;

(14) cutting a fiber of the first fiber bundle and the second fiber bundle along an inner wall of the female die cavity and compacting the fiber and the powder via the pre-pressing molding device;

(15) repeating step (2) such that a distance between an upper surface of a fiber-powder composite material in the female die cavity and the upper surface of the rotating table is equal to the thickness of a single layer of the powder, and the upper surface of the fiber-powder composite material is located below the upper surface of the rotating table;

(16) repeating steps (3)-(15) until the number of layers of the powder is one less than that in the desired multi-directional continuous fiber-reinforced composite material;

(17) repeating step (3), step (4), and step (13) in sequence;

(18) performing, by the pre-press molding device, pre-pressing of a last layer of the powder to obtain a preform; and

(19) repeating step (2) to allow the backing plate to move upward; collecting the preform, and subjecting a graphite mold and the preform in the graphite mold to sintering in a hot-pressing furnace to obtain the multi-directional continuous fiber-reinforced composite material.

* * * * *